(12) United States Patent
Riedl

(10) Patent No.: US 11,880,731 B2
(45) Date of Patent: Jan. 23, 2024

(54) CHIP CARD

(71) Applicant: GIESECKE+DEVRIENT MOBILE SECURITY GMBH, Munich (DE)

(72) Inventor: Josef Riedl, Attenkirchen (DE)

(73) Assignee: GIESECKE+DEVRIENT MOBILE SECURITY GMBH, Munich (DE)

(*) Notice: Subject to any disclaimer, the term of this patent is extended or adjusted under 35 U.S.C. 154(b) by 12 days.

(21) Appl. No.: 17/633,675

(22) PCT Filed: Aug. 17, 2020

(86) PCT No.: PCT/EP2020/025376
§ 371 (c)(1),
(2) Date: Feb. 8, 2022

(87) PCT Pub. No.: WO2021/032318
PCT Pub. Date: Feb. 25, 2021

(65) Prior Publication Data
US 2022/0318584 A1    Oct. 6, 2022

(30) Foreign Application Priority Data

Aug. 22, 2019 (DE) .................. 10 2019 005 934.4

(51) Int. Cl.
*G06K 19/07* (2006.01)
*G06K 19/077* (2006.01)

(52) U.S. Cl.
CPC ... *G06K 19/0723* (2013.01); *G06K 19/07722* (2013.01)

(58) Field of Classification Search
CPC .................. G06K 19/0723; G06K 19/07722
USPC ........................................................ 235/492
See application file for complete search history.

(56) References Cited

U.S. PATENT DOCUMENTS

| 6,631,847 | B1 | 10/2003 | Kasahara et al. |
| 2006/0187063 | A1 | 8/2006 | Rietzler et al. |
| 2008/0072423 | A1* | 3/2008 | Finn ................ G06K 19/07327 29/857 |
| 2009/0289122 | A1* | 11/2009 | Jansen ................ G06Q 20/341 235/492 |
| 2009/0315680 | A1* | 12/2009 | Arimura .......... G06K 19/07749 340/10.1 |
| 2013/0222198 | A1* | 8/2013 | Kojima .................... H01Q 1/22 343/788 |

(Continued)

FOREIGN PATENT DOCUMENTS

| EP | 1411465 A1 | 4/2004 |
| WO | 2009/142656 A1 | 11/2009 |

(Continued)

OTHER PUBLICATIONS

"Identification Cards—Physical Characteristics", International Standard ISO 7810, First Edition, Dec. 15, 1985, 6 pages.

(Continued)

*Primary Examiner* — Allyson N Trail
(74) *Attorney, Agent, or Firm* — Workman Nydegger

(57) ABSTRACT

A chip card configured as a metal card is RFID-capable on both sides, by the windings of the transponder coil being formed by the metal layer itself. Gaps between the windings of the transponder coil are filled with insulating material. A chip module is arranged above the ends of the transponder coil such that these ends are not visible for the viewer.

19 Claims, 3 Drawing Sheets

(56) References Cited

U.S. PATENT DOCUMENTS

2018/0157954 A1* 6/2018 Herslow .......... G06K 19/07773

FOREIGN PATENT DOCUMENTS

| WO | 2014/113765 A1 | 7/2014 |
| WO | 2016/016251 A1 | 2/2016 |
| WO | 2017/007468 A1 | 1/2017 |
| WO | 2018/132404 A1 | 7/2018 |

OTHER PUBLICATIONS

Search Report from corresponding German Patent Application DE 10 2019 005 934.4, dated May 13, 2020.
International Search Report and Written Opinion from corresponding PCT Application PCT/EP2020/025376, dated Oct. 14, 2020.

* cited by examiner

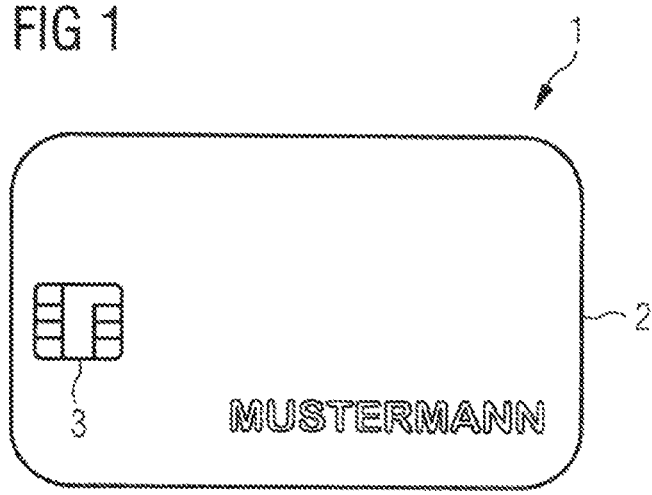
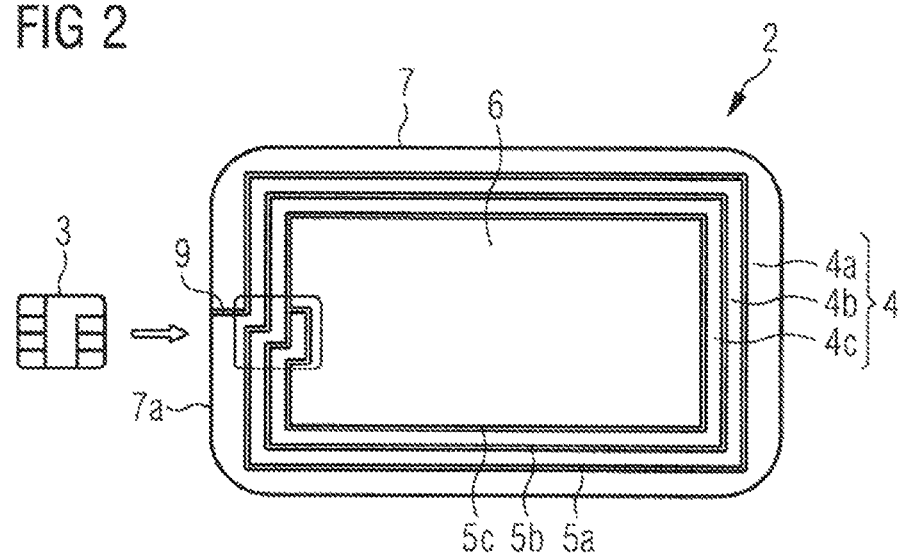

CHIP CARD

BACKGROUND

The invention relates to a chip card and a method for its manufacture. In particular, the invention relates to a so-called metal card.

To increase the exclusivity of chip cards for so-called prime users, so-called metal cards are offered, as a rule in the usual ID-1 format in accordance with the international ISO 7810 standard. However, the present invention is not limited to metal cards of this format. Full metal cards, hybrid metal cards with a metallic side and a plastic side, and metal cards which are coated or printed on one or both sides with plastic or lacquer are known.

If such cards are only equipped for contact-based communication with a chip module, the contact areas of which are located in a surface of the metal layer or another external layer, communication with metal cards is unproblematic. In the case of chip cards that are equipped with a transponder coil for inductive coupling, which can thus only or also (dual interface card) be operated in contactless manner, the metal layer can interfere with or completely hinder communication. From WO 2016/016251 A1, for example, a two-layer dual interface chip card with a metal layer and a plastic layer is known. The transponder coil arranged between the metal layer and the plastic layer is shielded against interfering capacitive influences of the metal layer by a ferrite layer arranged between the coil and the metal layer. However, the RFID transmission only works on one side, as the transmission on the other side of the card is prevented by the metal layer.

A similar card is known from WO 2014/113765 A1, but in which the chip module inserted into the metal surface is a dual interface module, i.e. the chip module itself has a small transponder antenna, so that communication is also possible from the metal side. Although the transponder coil of the dual-interface chip module is coupled to a larger coil in the back side of the chip card, which acts as a so-called booster antenna, the voltage that can be induced from the front side of the card is small, due to the small diameter of the transponder coil in the dual-interface chip module. This applies correspondingly to the full metal card known from WO 2018/132404 A1, in which a transponder coil with a chip is arranged in an aperture in the metal card and can thus receive RFID signals from both sides.

A multilayer metal chip card with a large-diameter transponder is known from WO 2017/007468 A1. Here the metal layer is only provided as a metal inlay, which is surrounded on the circumferential side by a plastic frame in which the transponder coil is laid. With this card, too, it is possible to receive RFID signals from all sides of the metal card, but with this structure it is not possible for the metal layer to extend over the entire area of the card, i.e. from card edge to card edge.

SUMMARY

The object of the present invention is therefore to make available a metal chip card which can receive radio signals from both sides with a high signal yield and which can also be configured as a full-area metal card.

According to one aspect, the chip card comprises a card body which is composed of one or several layers and which in any case comprises a self-supporting metal layer. This metal layer can extend over the entire chip card to all edges of the chip card, but this is not mandatory. The chip card has an integrated circuit or chip, preferably in the form of a chip module embedded in the chip card, as well as a transponder coil coupled to the chip. The special thing is that the windings of the transponder coil are formed by the metal layer itself. The spaces between the windings are filled with insulating material.

With reference to the metal layer, "self-supporting" means that it is not a printed metal layer, for example. Transponder coils printed with metallic ink are widely known from the prior art. Rather, the self-supporting metal layer is a foil or a plate of a metal, in particular a non-rusting metal, which is intended to give the card a special value.

The insulating material in the gaps of the transponder coil is intended to shield the windings from one another with reference to a capacitive coupling. A possible material for this is ferrite, for example.

If the metal layer is on the outside and forms one of the main areas of the card body, it is preferably covered over the full area with an insulating layer in order to prevent a coupling between the fingers of a user and the windings of the transponder coil. Otherwise this would influence the oscillating circuit of the transponder coil and prevent signal transmission. If it is a full metal card in which the entire card body is formed by the metal layer or several metal layers, the metal layer or the metal layers on both main areas of the chip card can be covered over the full area with such an insulating layer.

In particular, the metal layer can be lacquered, printed or coated with a foil, wherein the coating is preferably transparent on at least one side in order to visually bring out the exclusive effect of the metallic surface for the viewer.

Accordingly, the metal layer or, in the case of several superimposed metal layers, the group of metal layers overall can have a total thickness that amounts to only 25% or more, preferably at least 50% and particularly preferably at least 75% of the thickness of the card body. The card body is particularly preferably formed completely by the at least one metal layer. Accordingly, the total thickness of the metal layer or metal layers in the case of a chip card in the ID-1 format is between 0.2 and 0.76 mm.

The windings of the transponder coil preferably run in an outer region of the chip card along the outer edge of the chip card in order to obtain the largest possible area enclosed by the coil so that the voltage induced in the card by an external magnetic field is as high as possible. It is particularly effective if the windings of the transponder coil have a winding running along the edge of the chip card, i.e. the edge of the chip card or the outer edge of the metal layer delimits the outer winding of the transponder coil. In this manner the coil windings can be arranged with the maximum diameter. It applies to all embodiments of the invention that the windings formed by the metal layer and the gaps between the windings filled with insulating material are adjusted in their width, such that the transponder coil has the desired resonance frequency. A typical resonance frequency for RFID transponder coils in chip cards is 13.56 MHz for a transponder coil with 3 to 10 windings.

As already mentioned, the metal layer is integrated into the chip card primarily for aesthetic reasons and should be visible to the viewer at least on one side, preferably on both sides. This also means that the gaps between the windings filled with insulating material can be visible to the viewer.

In this respect, it can be advantageous if the insulating material does not differ optically from the metal, or does not differ significantly.

If, however, the insulating material in the gaps is visually conspicuous, this effect can be utilized aesthetically in such a manner that the windings of the transponder coil act like nested frames. For this purpose, the windings advantageously run parallel to one another and parallel to the outer edge of the chip card, specifically preferably over the entire circumference of the card.

In order to ensure this uniform visual impression, it is advantageous to arrange a chip module in the chip card in such a manner that any discontinuities in the course of the coil windings are covered. Specifically, the chip module is preferably arranged in such a manner over the windings of the transponder coil that, when the chip card is viewed from above, in the region of the chip module exclusively sections of the windings of the transponder coil are visible which run parallel to a respective nearest outer edge of the metal layer and thus parallel to the nearest edge of the chip card. In the further course of the windings, as mentioned above, these are located parallel to one another and parallel to the edge of the chip card, so that the impression of frames nested within one another is created.

The aforementioned arrangement of the chip module poses a problem with reference to the winding running on the edge of the chip card, because this outer winding does not, of course, run around completely (this would result in a short circuit), but is separated at a point from the closest adjacent winding in the form of a slot extending up to the outer edge of the chip card. Contact areas of the chip module for contact-based data transmission do not extend up to the edge of the chip card due to the standards, so that this slot remains visible to the viewer and could have an interfering effect. An alternative embodiment of the transponder coil provides, in order to avoid the interfering slot, that the external transponder coil does not run on the edge of the chip card, but rather in a manner spaced apart therefrom. It is then possible to cover all discontinuities in the course of the coil windings by means of a suitable arrangement of the chip module.

In a further development, a central region of the metal layer can be recessed and filled with plastic. This is the region that is enclosed by the windings of the transponder coil. This central region can be equipped with special security features. In addition, the surface of the metal layer with or without the recessed central region can be supplied with texture elements, for example with logos, patterns and/or alphanumeric characters, for example by lasering, milling or piercing.

BRIEF DESCRIPTION OF THE DRAWINGS

In the following the invention is described by way of example with reference to the accompanying figures. The figures are described as follows:

FIG. 1 a chip card according to an embodiment example of the invention,

FIG. 2 schematically a first variant for the relative arrangement of the chip module and coil windings, FIG. 3A a second variant of the relative arrangement of the chip module and coil windings, FIG. 3B the arrangement according to FIG. 3A in cross section, FIG. 4 the first variant according to FIG. 2 with a punched-out central region and FIG. 5 the second variant according to FIG. 3A with a punched-out central region.

DETAILED DESCRIPTION OF VARIOUS EMBODIMENTS

Figure 3A:
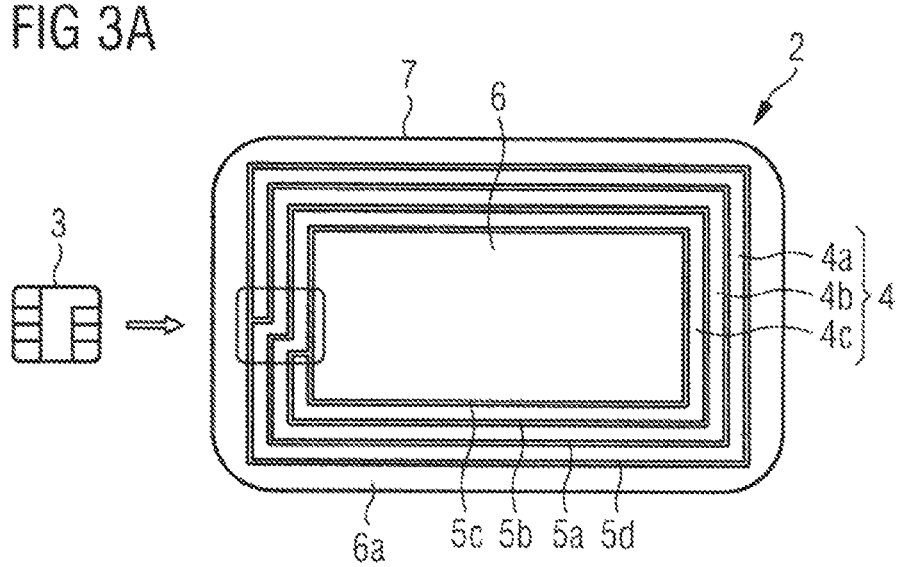

FIG. 1 shows an embodiment of a metal chip card 1 in plan view. The metallic surface of the metal layer 2 is visible to the viewer. The metal layer 2 extends over the entire area of the chip card 1, apart from the region of the chip card 1 in which a chip module 3 is integrated and forms a portion of the surface of the chip card 1 with its contact areas. The metallic surface of the metal layer 2 is supplied with a transparent lacquer outside the contact areas of the chip module 3. Instead or in addition, it can be printed and/or textures can be introduced into the metallic surface, such as the exemplary texture "MUSTERMANN".

A transponder coil 4, which cannot be recognized here and is described in more detail with reference to the following FIGS. 2 and 3, is integrated in the metal layer 2, and the gaps 5a-5c, likewise represented in more detail in the FIGS. 2 and 3, between the windings 4a, 4b of the transponder coil 4 are filled with insulating material. However, because the optical impression of the insulating material is very similar to that of the metal layer 2, the transponder coil 4 is hardly noticeable when the chip card 1 is viewed in plan view and is therefore not visible in the representation according to FIG. 1.

FIG. 2 shows the metal layer 2 schematically in a plan view such that three windings 4a, 4b, 4c of the transponder coil 4 and the gaps 5a, 5b between the windings 4a to 4c and a further gap 5c, which separates the innermost winding 4c from a central region 6 of the metal layer 2, can be seen. The outer winding 4a runs on the outer edge 7 of the metal layer 2 and thus on the edge of the chip card 1 according to FIG. 1, because the metal layer 2 extends over the entire chip card 1 in the embodiment example described here. But this is by no means mandatory. The metal layer 2 can just as well be an inlay in the chip card 1 such that it does not extend to the edge of the chip card 1.

The chip module 3 is arranged over the windings of the transponder coil in such a manner that the discontinuities of the windings that occur in the left region of the metal layer 2 in FIG. 2 are covered by the chip module 3. When the chip card 1 is viewed from above onto the chip module 3, exclusively sections of the windings 4a to 4c are then visible, which run parallel to the nearest outer edge 7a of the metal layer 2.

The two ends of the transponder coil 4 formed by the windings 4a to 4c are connected to the chip module 3 from below in an electrically conductive manner. Between the coil end of the outer winding 4a and the middle winding 4b, a slot 9 extends up to the outer edge 7a of the metal layer 2, which is not covered by the chip module 3. FIG. 3A shows a second variant of configuration of the transponder coil 4, in which both ends of the transponder coil 4 come to lie below the chip module 3. Here the outer winding 4a does not run immediately on the outer edge 7 of the metal layer 2, but rather the entire transponder coil 4 is offset somewhat inward. Accordingly, there results a further gap 5d between the outer winding 4a and an outer region 6a of the metal layer 2, which is filled with insulating material in the same manner as the gap 5c which separates the central region 6 of the metal layer 2 from the inner winding 4c. As can be gathered from FIG. 3A, this arrangement can be configured in such a manner that no slot filled with insulating material leads to the outer edge 7 of the metal layer 2, unlike in the above-described first variant according to FIG. 2.

Figure 3B:
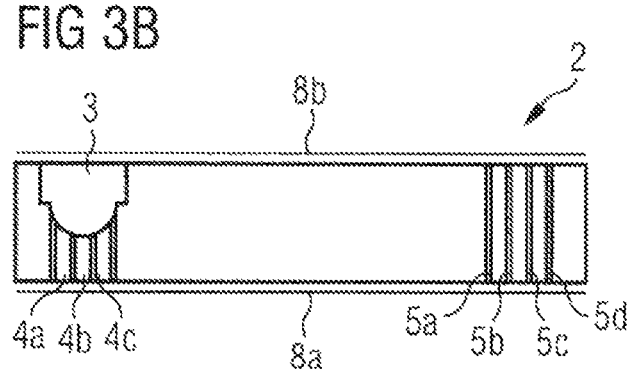

FIG. 3B schematically shows the arrangement according to FIG. 3A in cross section. It can be recognized in particular that this is a metal layer 2 for a full metal card, in which the card body is formed solely by the metal layer 2. It is also represented schematically how the chip module 3 is incorporated into a cavity of the metal layer 2. The metal layer 2 can alternatively be formed by several metal layers, and the one or several metal layers can form a multilayer card body with further layers, in particular plastic layers, which can be transparent and/or opaque.

In FIG. 3B with protective layers 8a and 8b there is indicated a preferably transparent or translucent lacquer layer on the mutually opposite main areas of the metal layer 2. One or both of the protective layers 8a, 8b can be replaced by a printing layer and/or a laminated plastic foil.

These can likewise be transparent or translucent, or at least one layer can possibly also be completely opaque. With reference to the metal layer, the protective layers 8a, 8b also function as insulating layers, which prevent the oscillating circuit from being detuned through contact.

Figure 4:
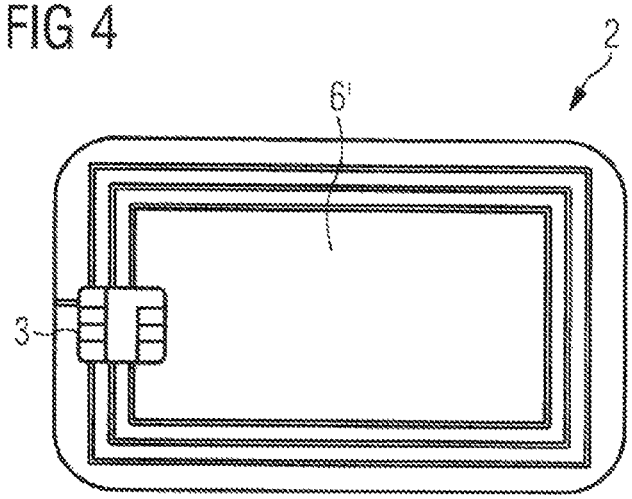
Figure 5:
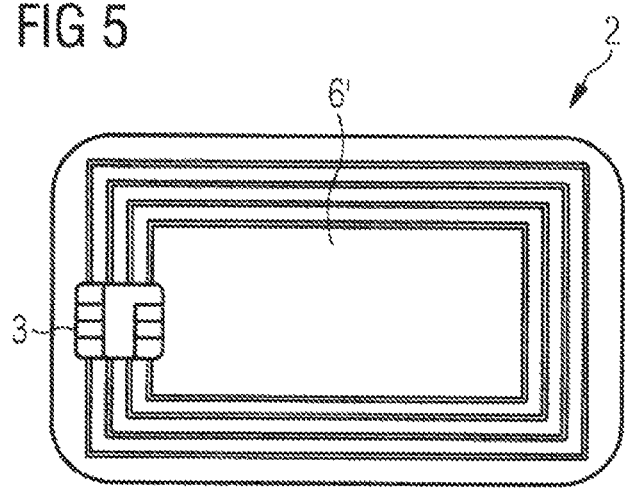

FIG. 4 shows the metal layer 2 as in FIG. 2, in which, however, the central region 6 is punched out and replaced by a plastic filling 6'. FIG. 5 accordingly shows the metal layer 2 as represented in FIG. 3A, wherein the central region 6 of the metal layer 2 is likewise recessed and filled with plastic 6'.

Metal cards according to the above embodiment examples are RFID-capable on both sides.

The invention claimed is:

1. A chip card comprising:
   a card body composed of one or several layers, of which at least one layer is a self-supporting metal layer,
   an integrated circuit, and
   a transponder coil coupled to the integrated circuit,
   wherein the transponder coil has windings and gaps between the windings,
   wherein the windings of the transponder coil are formed by the at least one metal layer,
   wherein the gaps between the windings are filled with insulating material;
   wherein the card body has two mutually opposite main areas, and
   wherein at least one of the main areas is formed by the at least one metal layer and is covered fully with a cover layer arranged to protect the windings of the transponder coil from contact external to the card body.

2. The chip card according to claim 1, wherein the insulating material is ferrite.

3. The chip card according to claim 1, wherein the at least one metal layer is lacquered, printed or coated with a foil.

4. The chip card according to claim 1, wherein texture elements are introduced into the surface of the at least one metal layer.

5. The chip card according to claim 1, wherein the card body has a thickness and the at least one metal layer overall has a total thickness,
   wherein the total thickness of the at least one metal layer amounts to at least 25%, of the thickness of the card body.

6. The chip card according to claim 5, wherein the total thickness of the at least one metal layer is in a range of 0.2 and 0.76 mm.

7. The chip card according to claim 1, wherein the card body is formed completely by the at least one metal layer.

8. The chip card according to claim 1, wherein the windings of the transponder coil have a winding running along an outer edge of the metal layer.

9. The chip card according to claim 1, wherein the windings of the transponder coil comprise an outer winding which runs in a manner spaced apart from an outer edge of the metal layer.

10. The chip card according to claim 1, wherein a chip module is arranged over the windings of the transponder coil in such a manner that, when the chip card is viewed from above, in the region of the chip module exclusively sections of the windings of the transponder coil are visible, which run parallel to a respective nearest outer edge of the metal layer.

11. The chip card according to claim 1, wherein the chip module has the integrated circuit and contact areas for contact-based data transmission.

12. The chip card according to claim 1, wherein a central region of the at least one metal layer is recessed and filled with plastic.

13. A method for producing a chip card according to claim 1, wherein the windings of the transponder coil in the at least one metal layer is produced in a region corresponding to the gaps between the windings by removing material in one of the gaps,
    wherein this region is subsequently filled with the insulating material.

14. The method according to claim 13, wherein a central region of the at least one metal layer is removed and filled with plastic.

15. The chip card according to claim 1, wherein the cover layer is a transparent or translucent lacquer layer.

16. The chip card according to claim 1, wherein the cover layer is opaque.

17. The chip card according to claim 1, wherein the cover layer is a transparent or translucent printing layer or a laminated plastic foil.

18. The chip card according to claim 1, wherein the cover layer is plastic.

19. A chip card comprising:
    a card body composed of one or several layers, of which at least one layer is a self-supporting metal layer,
    an integrated circuit, and
    a transponder coil coupled to the integrated circuit,
    wherein the transponder coil has windings and gaps between the windings,
    wherein the windings of the transponder coil are formed by the at least one metal layer,
    wherein the gaps between the windings are filled with insulating material;
    wherein the card body has two mutually opposite main areas, and
    wherein at least one of the main areas is formed by the at least one metal layer and is covered with a plastic cover layer arranged to protect the windings of the transponder coil from contact external to the card body;
    wherein the cover layer is transparent, translucent or opaque;
    wherein the cover layer is selected from the group consisting of a lacquer layer, a printing layer and a laminated plastic foil.

* * * * *